R. H. MANSON.
MEANS FOR PROTECTING GOVERNORS.
APPLICATION FILED JULY 31, 1916.

1,346,228. Patented July 13, 1920.

Inventor
Ray H. Manson
By F. O. Richey
His Atty.

UNITED STATES PATENT OFFICE.

RAY H. MANSON, OF ROCHESTER, NEW YORK, ASSIGNOR TO THE GENERAL PHONOGRAPH MANUFACTURING COMPANY, OF ELYRIA, OHIO, A CORPORATION OF OHIO.

MEANS FOR PROTECTING GOVERNORS.

1,346,228.  Specification of Letters Patent.  Patented July 13, 1920.

Application filed July 31, 1916. Serial No. 112,218.

*To all whom it may concern:*

Be it known that I, RAY H. MANSON, a citizen of the United States, residing at Rochester, in the county of Monroe and State of New York, have invented certain new and useful improvements in means for protecting governors, and more particularly centrifugal governors, employed upon such devices as phonographs; and I do hereby declare the following to be a full, clear, and exact description of the invention, such as will enable others skilled in the art to which it appertains to make and use the same.

Ball governors are frequently made heavy and connected to the frame through some flexible means, such as springs, which are apt to be broken if the balls, through the operation of the motor are thrown too far from the governor shaft, or if the phonograph or other object upon which the governor is used is dropped or in other manner given a sudden jerk.

The principal object of my invention is to provide means to prevent the breaking or injury of any parts of the governor.

Another object of my invention is to provide a suitable protecting means for the governor which can be cheaply and easily made, and which does not encumber or overweight the motor.

Other objects of my invention and the invention itself will probably be better understood from a description of an embodiment of my invention.

Figure 1:
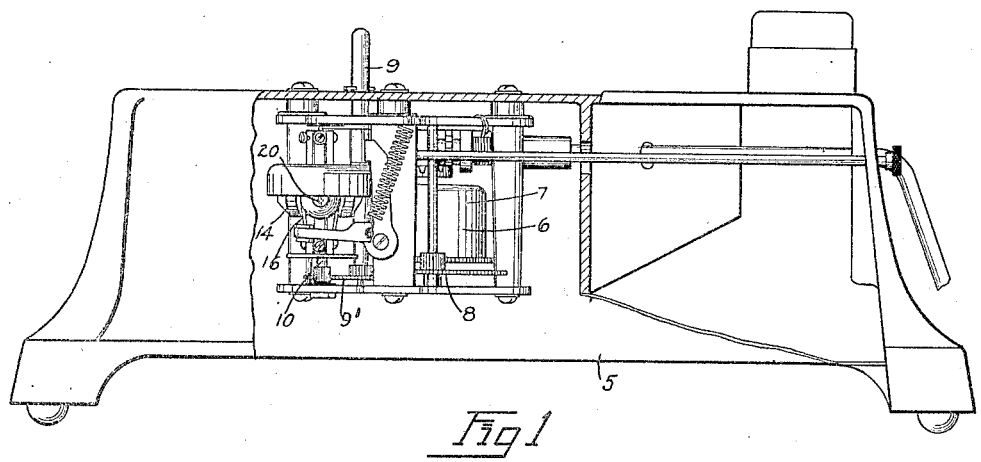
Figure 1 is a general view of a motor and a portion of a phonograph showing the use of the embodiment of my invention here illustrated.
Figure 2:
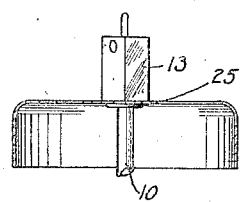
Fig. 2 is a section through the embodiment of my invention shown in Fig. 1.
Figure 3:
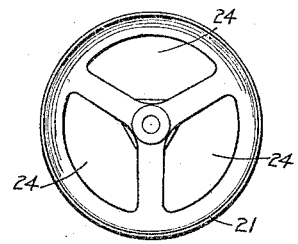
Fig. 3 is a bottom plan view of the device shown in Fig. 2.
Figure 4:
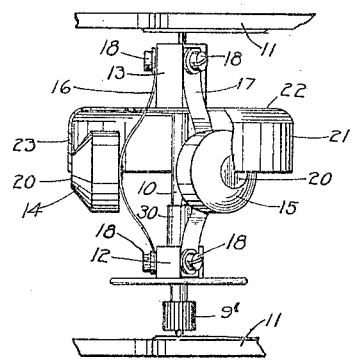
Fig. 4 shows the device partly in elevation and partly in section when used in connection with a governor.

Referring now to the drawing and the embodiment of the invention illustrated therein, at 5 is shown the frame of a phonograph and at 6 is shown a motor, such as a spring motor. The spring is inclosed within the casing 7 and through a train of gears 8 drives a shaft 9 which carries the record support, not shown. Through other gears 9' the governor shaft 10 is driven. This shaft is journaled in the frame 11 and carries a pair of bearings 12 and 13. The governor balls or weights are shown at 14 and 15, so supported from the governor shaft as to be drawn in and out functionally to the rate of rotation of the shaft. Any suitable connecting means may be employed which will permit such movement of the balls without undue impediment. Strips of flexible material or springs, such as employed in the embodiment illustrated and shown at 16 and 17, are convenient and can be easily and cheaply made.

The ends of the strips 16 and 17 are connected by suitable means, such as screws 18, to the bearings 12 and 13. As will be seen, the balls 14 and 15 are comparatively heavy and the springs 16 and 17 are comparatively light. If the machine 5 were accidentally dropped upon the floor, which occasionally happens, especially in the use of smaller machines, the momentum of the relatively heavy balls will cause a distortion or breaking of one or more of the springs or strips 16 and 17, unless means are provided for protecting them. It also happens sometimes that the motor will run fast enough to cause the balls 14 and 15 to fly out farther than is intended, distorting or breaking one or more of the springs 16 and 17, or by repeatedly bending a spring beyond its elastic limit, so weaken it that it will be broken or so disabled that it will not properly perform its function. I provide means for preventing such accidents happening. This is done, for example, by providing means to prevent the balls, or any of them, being cast outward farther than is intended.

In the embodiment of my invention illustrated, the governor balls are provided with flat or substantially flat faces or surfaces 20 which are adapted to engage the underside of a bell-shaped member 21, which is mounted upon the shaft 10, in the form shown, between the bearing member 13 and a collar 25 upon the shaft 10. One advantage of using strips and equivalent means is that the balls will always be in such positions that the flattened faces will engage the surface of the movement limiting means when the balls have moved radially far enough from the shaft to engage the limiting means, thus insuring surface engagement.

The member 21 is provided with a top 22 and a downwardly extending flange 23.

Openings 23 are provided in the top of the member 21, through which the springs operate. The radius of the bell-shaped member 21 is greater than the radius of operation of the governors for the normal operation of the phonograph; that is, the distance from the center of the shaft 10 to the inner periphery of the flange 22 is greater than the distance from the center of the shaft 10 to the periphery of the greatest circle made by the surface 20 of the balls 14 and 15 under normal operating conditions. The radius of the member 21 is, however, short enough to prevent the balls 14 and 15 from being moved so far from the center of the shaft 10 as to injure or break the springs 16 and 17.

It will be understood that the bearing 12 can be moved up and down upon the shaft 10. In the form shown it is mounted upon a hollow collar 30 about the shaft 10, which slides up and down over said shaft.

While I have shown a bell-shaped member 21, it will be understood that this member may be made of any suitable shape. Among the advantages of the particular embodiment shown are that it can be easily stamped out of cheap material. It adds little or no weight to the motor; can be conveniently mounted thereon and does not in any way interfere with the proper operation of the motor. The governor balls or weights may, of course, be of any suitable shape and size. It is customary to speak of them as balls, though their shape is more often perhaps not spherical than spherical.

It will also be understood by those skilled in the art that numerous and extensive departures may be made both from the embodiment and from the details shown in the drawing. This embodiment and these details have been shown solely for the purpose of explaining the invention.

What I claim as new is:—

In a device of the class described, a rotatable shaft, a bell-shaped member mounted fixedly on said shaft and having openings in the top thereof, a block adapted to slide on said shaft, leaf springs secured to said member and said block, weights secured to the intermediate portion of said springs, whereby on excessive rotation the block slides on the shaft and the weights engage said member.

In witness whereof, I have signed my name hereunto this 25th day of July, 1916.

RAY H. MANSON.